United States Patent
Aufzien

(10) Patent No.: US 12,492,080 B2
(45) Date of Patent: Dec. 9, 2025

(54) MODULAR IDLER ROLLER SYSTEM WITH RECESSED AND/OR ADAPTABLE ENDS

(71) Applicant: Astria Capital LLC, New York, NY (US)

(72) Inventor: Jonathan M. Aufzien, New York, NY (US)

(73) Assignee: Astria Capital LLC, New York, NY (US)

( * ) Notice: Subject to any disclaimer, the term of this patent is extended or adjusted under 35 U.S.C. 154(b) by 305 days.

(21) Appl. No.: 18/123,568

(22) Filed: Mar. 20, 2023

(65) Prior Publication Data

US 2024/0025658 A1 Jan. 25, 2024

Related U.S. Application Data

(60) Provisional application No. 63/321,969, filed on Mar. 21, 2022.

(51) Int. Cl.
*B65G 39/09* (2006.01)
*B65G 47/00* (2006.01)

(52) U.S. Cl.
CPC .................... *B65G 39/09* (2013.01)

(58) Field of Classification Search
CPC ................ B65G 39/09; B65G 47/00
USPC .............................................. 193/37; 198/617
See application file for complete search history.

(56) References Cited

U.S. PATENT DOCUMENTS

| | | | | |
|---|---|---|---|---|
| 5,848,958 A * | 12/1998 | Damkjær | | B65G 39/02 |
| | | | | 492/38 |
| 6,502,690 B1 * | 1/2003 | Specht | | B65G 13/07 |
| | | | | 198/791 |
| 7,290,649 B2 * | 11/2007 | Wolkerstorfer | | B65G 13/073 |
| | | | | 198/781.04 |
| 9,440,796 B2 * | 9/2016 | Axmann | | B65G 39/16 |
| 9,682,825 B2 * | 6/2017 | Rudolph | | B65G 39/04 |
| 10,514,064 B2 * | 12/2019 | White | | B25B 27/00 |
| 10,858,195 B1 * | 12/2020 | Levadnyi | | B65G 39/09 |
| 11,975,924 B2 * | 5/2024 | Schmidgall | | B65G 39/02 |
| 2008/0018167 A1 * | 1/2008 | Fuji | | |
| 2013/0105275 A1 * | 5/2013 | Lim et al. | | |

\* cited by examiner

*Primary Examiner* — Douglas A Hess
(74) *Attorney, Agent, or Firm* — David L. Cohen

(57) ABSTRACT

A modular roller system. The system includes a mechanical shaft and at least one plastic disc. The one or more the discs may include a recessed end abutting one side of the plastic disc. The system also includes an assembly in physical contact with the recessed end and positioned in an inside of the recessed end. The one or more discs slide onto and around the mechanical shaft using frictionless bearing system.

7 Claims, 18 Drawing Sheets

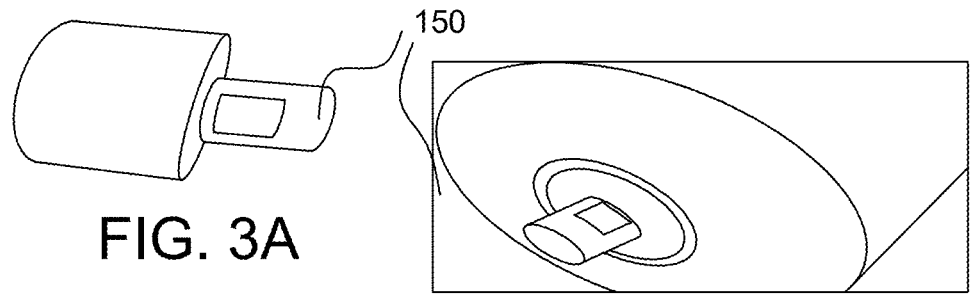
FIG. 3A
FIG. 3B
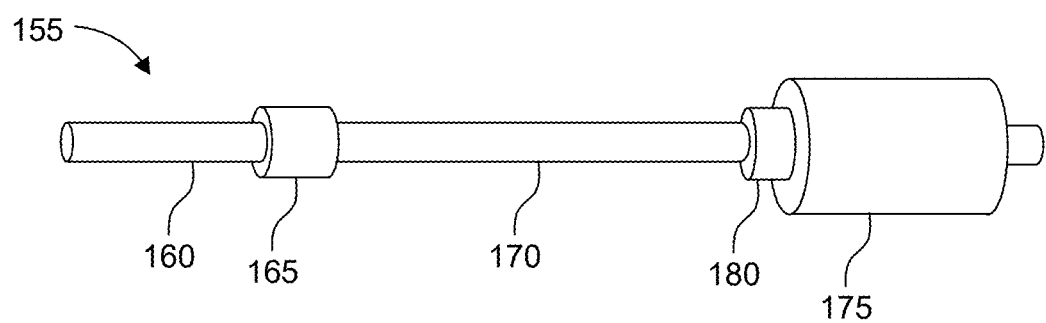
FIG. 3C
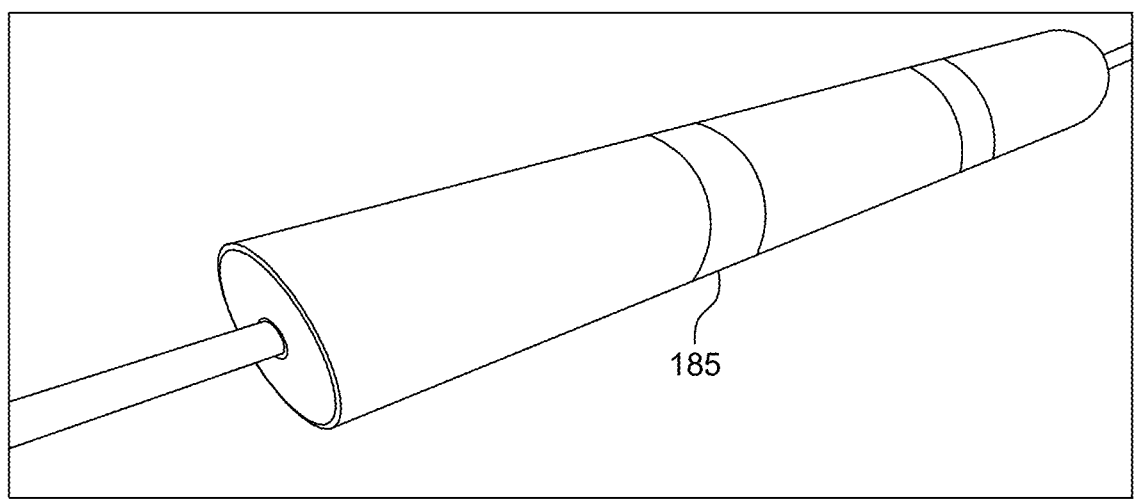
FIG. 3D

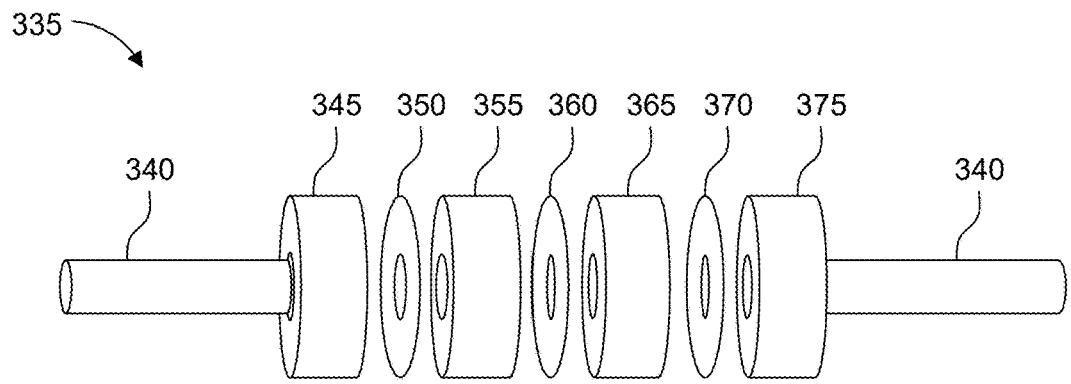
FIG. 6
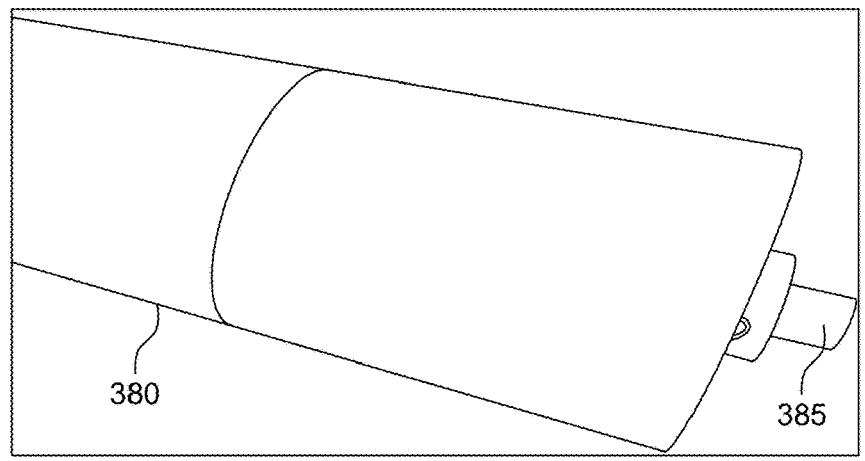
FIG. 7A
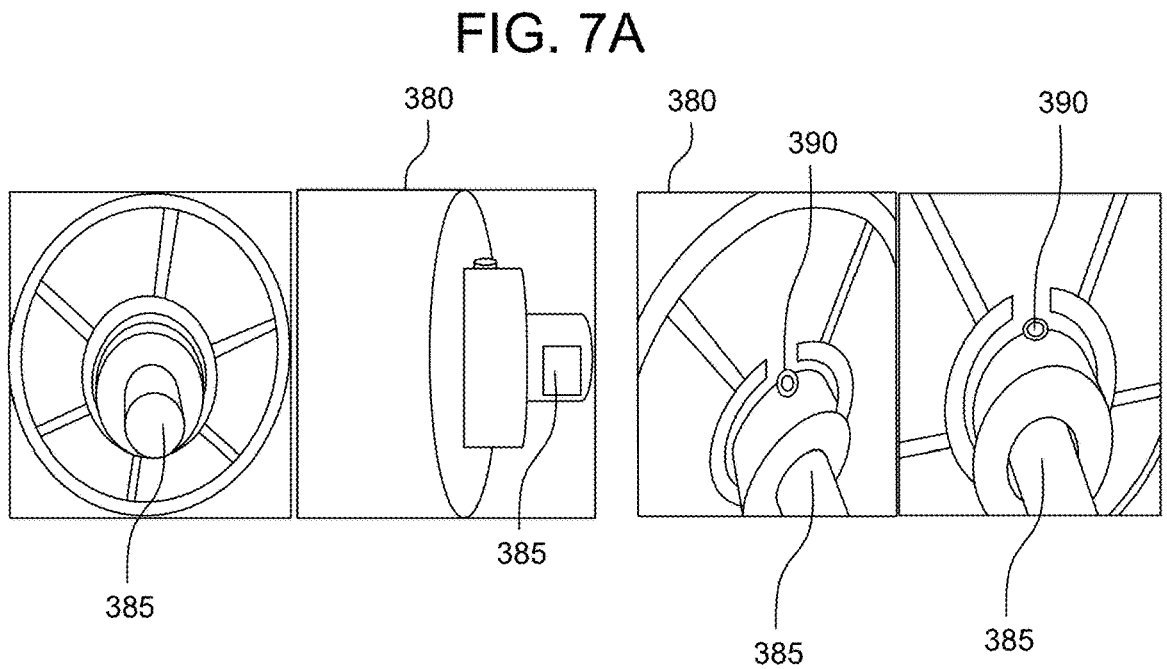
FIG. 7B
FIG. 7C

MODULAR IDLER ROLLER SYSTEM WITH RECESSED AND/OR ADAPTABLE ENDS

BACKGROUND

Field of the Disclosure

The present disclosure generally relates to rollers, and more particularly to a modular roller methods and systems.

Description of Related Art

It has been observed by some that idler rollers in conveyor systems may be comprised of mostly of a steel tube and bearing design. These idler rollers may have many different lengths, diameters, and other specifications. It has also been noted that demand for idler rollers may be unpredictable, which might require more inventory than available for a particular size/type—yet, many other sizes/types do not meet the requirements for the demand, thusly not turning over. In addition, many metric sizes could be hard to source and very expensive to have custom produced.

SUMMARY

The present disclosure teaches a Modular Idler Roller System to (i) produce idler rollers according to demand in our own shop with limited production equipment/machinery; and (ii) use a limited range of standard modular inventory parts to produce a wide variety of end products.

This present disclosure concerns a particular type of Modular Idler Roller and a system that allows easy assembly of the roller. The parts of the roller are typically solid or molded plastic discs that slide onto and around a solid steel shaft without the use of traditional ball bearings. Recessed ends shield fastening hardware, and when required a variety of End Adapters can be used to create functional drop-in replacements for existing machinery's idler parts (which are traditionally steel tubes using ball bearings). The present disclosure may make assembly and inventory management more efficient over known solutions but also may enable the use of solid and/or molded plastic discs without ball bearings should yield longer usable life, less potential for worn parts with sharp edges to damage other parts of the machinery, and greater potential to re-build used parts in many instances.

The present disclosure consists of solid and molded plastic cylinders, typically made out of ultra-high molecular weight polyethylene ("UHMW") or acetal plastic of varying diameters and lengths, each with a hole bored in the center to accommodate a round shaft, typically carbon or stainless steel. In addition, "end" pieces are further recessed on one end so that retaining fasteners can seal out dirt and be shielded from external materials that may cause contamination or damage. In some cases one-piece or multi-piece rollers with one or both ends recessed may be capped on one end with shaft extending out the other end ("Guide Rollers"). In some cases End Adapters may be used in order to make the ends of the shaft match a pattern or style used commonly in industry such that this product will be a "drop in" replacement in existing brackets or holes.

The Assembly System is such that with minimal machinery (usually a tape measure, a bandsaw and some simple hand tools), one can cut a shaft then slide the plastic parts onto it and push on fasteners on each end such that the parts stay together and function similarly to idlers of current common design.

BRIEF DESCRIPTION OF THE DRAWINGS

The present disclosure and its various features and advantages can be understood by referring to the accompanying drawings by those skilled in the art relevant to this disclosure. Reference numerals and/or symbols are used in the drawings. The use of the same reference in different drawings indicates similar or identical components, devices or systems. Various other aspects of this disclosure, its benefits and advantages may be better understood from the present disclosure herein and the accompanying drawings described as follows:

FIGS. 3(A)-3(D) illustrates embodiments of the present disclosure;
FIG. 6 illustrates an embodiment of the present disclosure;
FIGS. 7(A)-(C) illustrates embodiments of the present disclosure.

DETAILED DESCRIPTION

Figure 1A:
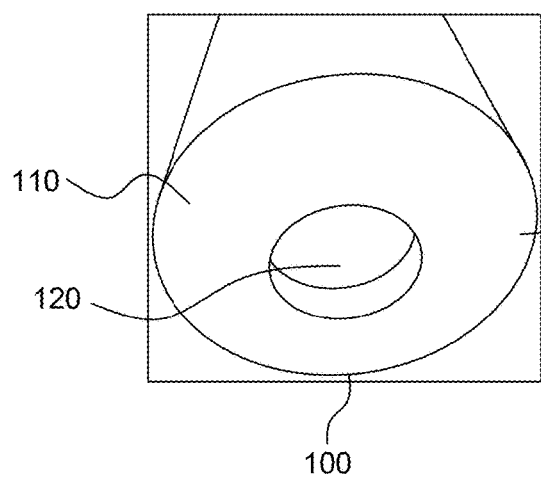
FIGS. 1(A)-1(D) illustrates embodiments of the present disclosure.

It has been observed that even with significant inventory in stock, a particular specification of idler roller having a set of parameters including, for example, diameter and length may not be available to meet a customer's needs. These idler rollers are typically made of steel tubing with steel bearings mounted at either end, and each is made for a different width and type of conveyor. This configuration does not easily support the ability to cut down or add size to meet a different size or use requirement. It may also be expensive to keep extra parts in stock to sufficiently satisfy demand without incurring high expense. Further, many metric sizes can be hard to source and time-consuming and expensive to have custom produced. Additionally, if not replaced in a timely manner, old steel rollers can damage conveyor belts once bearings seize, rollers stop spinning, and belt wear creates sharp metal edges.

It may be known of one ordinary skill in the art that conveyor idler rollers come in a wide variety of diameters, lengths, shaft end styles, and other parameters to match the different machines on which they are used. For example, conventional U.S. idlers for large industrial conveyors typically have a diameter of 4 or 5 inches, though larger is not unusual, while typical metric idlers can approximately range between 2.5 and 4 inches in diameter. More significantly, the length of each roller may need to scale with the width of the conveyor and belt. The most common belt widths for large industrial conveyors are 18 inches, 24 inches, 30 inches, 36 inches, 42 inches, 48 inches, and 60 inches but may be shorter, wider, or in between these widths depending on machine design. Metric belt widths add even more variety. In addition, although U.S. conveyors tend to use a common notched shaft end style that works with drop brackets according to CEMA* standards, the industry standard is for the bracket-to-bracket bolt hole distance rather than for the roller size. This means that different manufacturers' rollers of a particular CEMA standard should mount the same way including the roller and brackets, but the shaft length and face width of the same belt-width roller can and do differ across manufacturers. Metric rollers have shaft end styles that are different from U.S. rollers—typically straight shaft extensions (often used with u-bolts) or threaded ends.

*The Conveyor Equipment Manufacturer's Association (CEMA) is considered "The Voice of the Conveyor Industry" in North and South America.

The wide variety of roller options makes it very expensive to stock these parts. For example, stocking (6) each in both 4 in diam and 5 in diam of the most common U.S. belt width steel return rollers would require (84) units in stock. Extending this to self-cleaning disc-style rollers also would double this number to (168). Carrying metric size return rollers would increase this number even more so, and all of these numbers do not include shorter troughing idler rollers (of which greater numbers are typically needed because they are used three at a time). Even more inventory would be required if customers do not want to purchase new drop brackets and require different manufacturers' products with different length parameters. Because these rollers are typically much longer than they are wide and there is such a wide variety of lengths, storage tends not to be space-efficient in a typical warehouse. Steel rollers tend to be heavy in relation to their volumes, so incoming and outgoing shipping costs are relatively high. Also, shipping costs for smaller quantities (i.e., not on a pallet via truck) can be even more expensive if the lengths surpass standard UPS or Fedex length requirements and therefore require shipping surcharges—e.g., for boxes over 48 inches long. It should be noted that manufacturers may encourage distributors to stock a wide range of rollers in order to serve local customers better, but unless distributors know exactly which sizes will be in high demand, it is very likely that turnover of these parts will be low for the typical distributor. The logical response by distributors is to stock less and drop ship rollers from a manufacturer that keeps deep inventory, but this may increase time and cost to the customer depending on how quickly parts can ship and from where they may ship.

The modular assembly system of the present disclosure affords for more efficient inventory management and quicker customer service in most cases, but also enables the distributor or end user to create new idler roller solutions that may not be offered as standard products by current manufacturers. For example, if a customer wants a roller with a shorter or longer face width or with a different style of shaft end, the teaching of the present disclosure allows a wide range of design possibilities to be assembled without the high cost and time requirements of custom manufacturing.

The modular roller systems and methods of the present disclosure allows assembly of custom rollers without need for heavy machinery or welding or machining; tooling required includes bandsaw or chop saw to cut shaft plus simple hand tools. In one embodiment, the roller components are held together with retaining clips that can be installed with simple hand tools. In addition, End Adapters may also be slipped onto shaft ends by hand, which may not require hydraulic press or welding.

The present disclosure is distinct because it teaches a modular assembly system. In one embodiment, the present disclosure includes a modular solution that allows distributors or end users to assemble idler rollers of various dimensions and end shaft styles from a defined set of standard parts. This allows a very wide selection of idler rollers, including metric styles, to be available at short notice from more limited inventory, versus known solutions.

In another embodiment, the present disclosure teaches plastic cylinders of varying diameters and lengths, each with a hole bored in the center to accommodate a round shaft, which may be realized by carbon or stainless steel. Here, the plastic cylinder may, but not necessarily, be constructed using ultra-high molecular weight polyethylene ("UHMW") or acetal plastic of varying diameters and lengths, which have a hole bored possibly in the center to accommodate a round shaft. For the purposes of all embodiments disclosed, it is notes that when referencing plastic or plastic materials, it should be apparent that alternative types of plastics and other materials are contemplated by the teachings herein.

In still another embodiment of the present disclosure, a modular roller method and system is taught for (i) producing at least one roller according to demand in a distribution or end user environment with limited production equipment/machinery including Point of Sale Assembly ("POSA"). For the purposes of the present disclosure, POSA may be defined as rollers being assembled at the distributor/retail level.

This at least one idler roller may be produced while minimizing inventory to a limited range of standard modular parts. In an embodiment, the at least one idler roller may offer longer wear life and better safety characteristics with regard to damaging conveyor belts compared to convention a steel roller. In the present disclosure, modular systems and methods are disclosed for enabling distributors or end users to assemble idler rollers of various dimensions and end shaft styles from a defined set of common parts. This allows a very wide selection of idler rollers to be available at short notice from more limited inventory over known solutions.

In still another embodiment of the present disclosure, a modular roller construction is taught having a single idler roller using Solid Plastic Roller Segments and End Adapters taking into consideration demand cycles and inventory turnover. The present disclosure includes, in one embodiment, the use of a Solid Plastic Roller Segment on each end of idler roller with a Recessed End made to be compatible with various End Adapters such that final roller may be fabricated with shaft ends compatible with common styles in current use—or, in the alternative, can be designed for new applications. The present disclosure includes, in another embodiment, a System, including at least Roller Segments and End Adapters, to enable assembly of idler rollers in environments with potentially limited industrial tooling—e.g., possibly without computer numerical control ("CNC") machinery, presses, welding machinery. This embodiment may be realized because the need for ball bearings is materially reduced and possibly eliminated. In yet another embodiment, it is contemplated that the modular roller may be construction via an injection mold(s) a variant of various types of plastic, including ultra-high molecular weight polyethylene ("UHMW") and acetal. Herein, the roller segments may be made of solid plastic and, in another embodiment, can be "stacked" along length of shaft to make different face widths. The custom steel End Adapters may be selected depending on the style required. Further, steel shafting may be cut to length depending on need. It may be apparent to one of ordinary skill that modular plastic roller parts might be lighter and store in inventory more efficiently than do pre-assembled rollers.

In addition, "end" cylinders are further recessed on one or both ends so that retaining fasteners can seal out dirt and be shielded from external materials that may cause contamination or damage. In some cases, shaft End Adapters may be used to make the ends of the shaft match a pattern or style used commonly in industry such that this product will be a "drop in" replacement in existing brackets or holes. The Assembly System is such that with minimal tooling—typically a tape measure, a band-saw or chop-saw and hand tools—one can cut a shaft then slide the plastic parts onto it and push on fasteners on each end such that the parts stay together and function similarly to idlers of current common design.

Figure 1B:
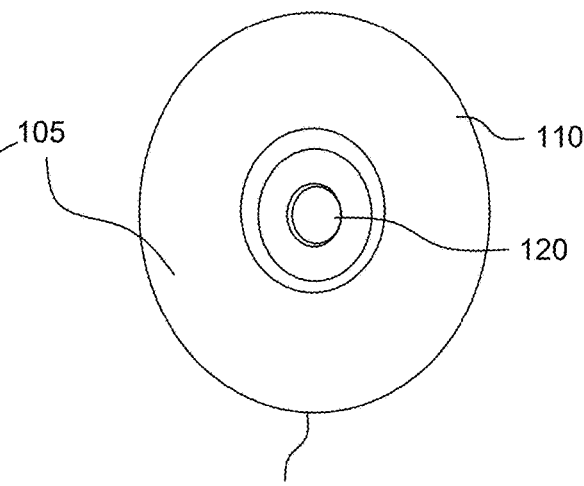

Referring to FIGS. 1(A) and 1(B), an embodiment of the present disclosure is illustrated. Here, a roller 100 is shown have a plastic cylinder 105 from a perspective and vertical view. Cylinder 105 may be constructed using UHMW or another plastic in one embodiment. Plastic cylinder 105, as depicted, has a finished recessed end 110. Cylinder 105 further includes a centered hole 120 for fitting and accepting a shaft (not shown). Hole 120 may be bored through the center. Cylinder 105 may have unfinished ends—as may bored hole 120—or have one or both ends finished with one or more counterbored recesses to accept retaining hardware; and/or end adapters; and/or labels. The present disclosure teaches that multiple cylinders, such as cylinder 105, can be assembled in series on a shaft to make a longer roller 100.

Figure 1C:
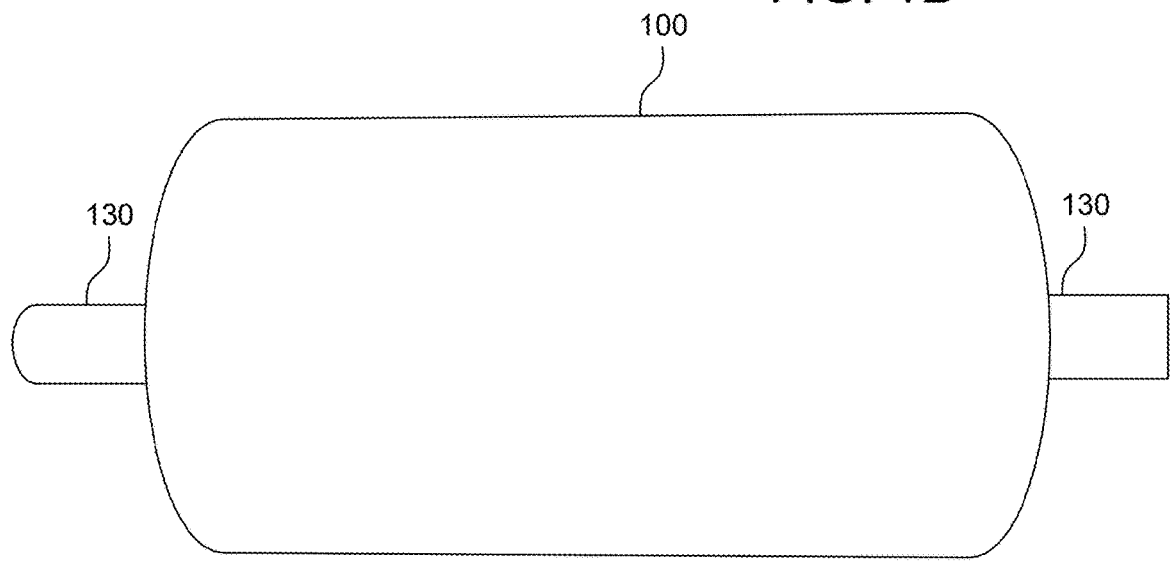

Referring to FIG. 1(C), another embodiment of the present disclosure is illustrated. Here, plastic cylinder 105 from FIGS. 1(A) and 1(B) includes a shaft 130. Shaft 130 may be constructed from a round carbon steel or stainless steel around which, for example, cylinder 105 spins. The ends of shaft 130 may be cut straight with no special finishing other than to smooth sharp edges with sandpaper, as needed. The ends of shaft 130 may extend from outer cylinders as is or may be shorter than overall cylinder face width and covered by shaft end adapters, if required for application.

It should be further noted that the present disclosure may include various additional embodiments. For example, additional retaining hardware may be included on each end of roller 100. This additional retaining hardware may include a gasket with low-friction side facing plastic cylinder. The gasket may comprise any material with at least one side having a low-friction surface, such as, for example, a fabric or nylon material(s). Further, multiple gaskets may be used as fillers as desired. In addition to the gasket, a washer constructed from various materials including carbon or stainless steel, may be included. Moreover, a retaining ring(s) constructed from various materials including carbon or stainless steel may also be included depending on application requirements. These application requirements may vary, for example, if a shaft end adapter is substituted for at least one of the retaining rings.

Figure 1D:
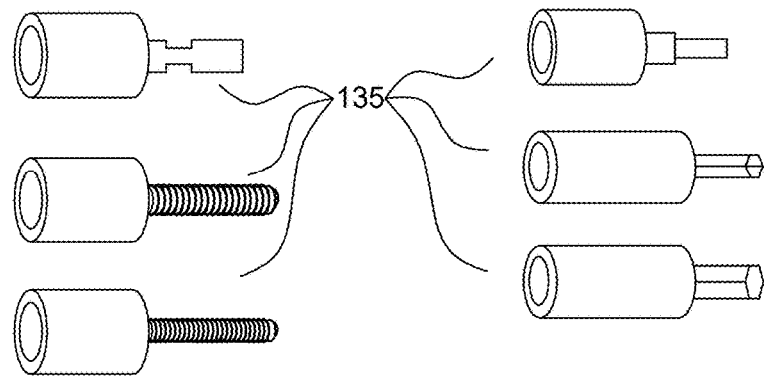

Referring to FIG. 1(D), another embodiment of the present disclosure is illustrated. Here, end adapter 135 is depicted with various though not exhaustive configurations. End adapter 135 that may be employed with roller 100 of FIGS. 1(A)-(C), for example. End adapter 135 may be constructed from various materials including, for example, carbon steel, stainless steel, aluminum, or plastic. End adapter 135 enables a round shaft end to conform with one of many industry-standard formats compatible with brackets or mounting holes on machines.

Figure 2:
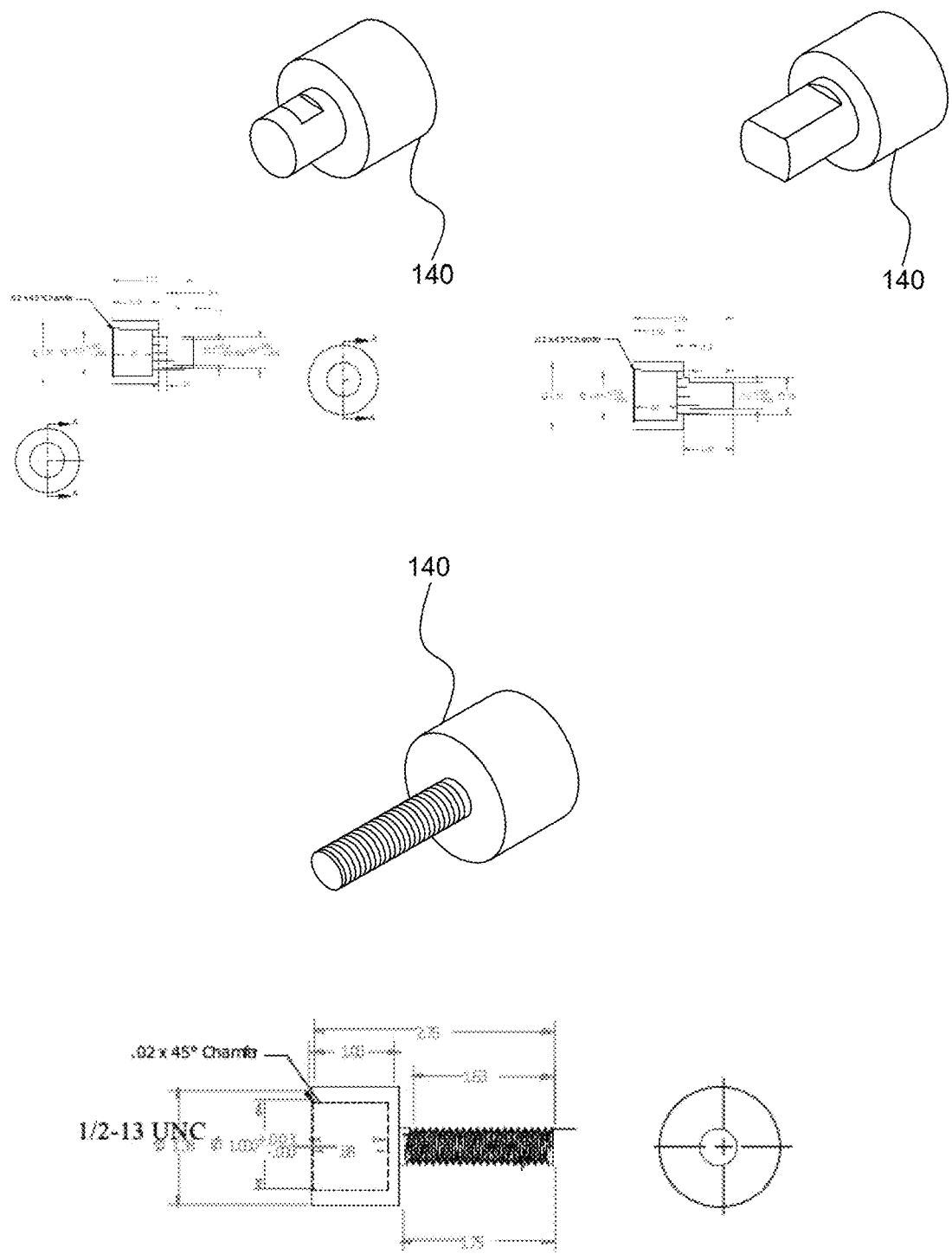
FIG. 2 illustrates an embodiment of the present disclosure.

Referring to FIG. 2, another embodiment of the present disclosure is illustrated. Here, we can see various configurations of an adaptor 140. We can see from the illustration a number of alternate views for adaptor 140.

Referring to FIGS. 3(A)-(B), another embodiment of the present disclosure is illustrated. More particularly, a notched end adapter 150 is depicted for use with roller 100 of FIGS. 1(A)-(D). Notched end adapter 150 with respect to roller 100 is shown here from a horizontal and perspective views.

It should be noted that the present disclosure may also include various additional embodiments. In instances where end users may not want to cut shafts to length, while still needing standard roller types and dimensions, an alternative modular shaft may be used. This may be referred to as a "roller in a box."

Referring to FIG. 3(C), another embodiment of the present disclosure is illustrated. More particularly, an extended roller 155 is depicted. Extended roller 155 may include a pre-cut, end shaft segment 160. End shaft segment 160 may include at least one end finished. In one embodiment, if at least one end is finished, this finished end may be realized various designs including but not limited a notched or threaded approach. If the at least one end is unfinished, an end adapter may be used.

Furthermore, extended roller 155 may include an extender coupler 165. In one embodiment, at least two shafts are coupled together through coupler 165. Coupler 165 may couple two or more shafts by various approaches including slipping, tapping or screwing the aforementioned shafts together. In one embodiment, coupler 165 may fit inside a recessed end of plastic disc. Additionally, a gasket may be used on at least one side of coupler 165.

Extended roller 155 may also include a center shaft segment 170. Center shaft segment 170 may be pre-cut. Moreover, center shaft segment 170 may come in different lengths. In one embodiment, center shaft segment 170 is designed in multiples of 6-inch measurements.

Extended roller 155 may also include at least one disc 175. Disc 175 may be designed of solid or molded plastic. In one embodiment, disc 175 may be recessed on at least one end. Disc 175 may be slid over center shaft segment 170 with at least one recessed portion fitting over a coupler 180. Each of the ends of disc 175 may abut against one another such that the extended roller 155 maintains the required stiffness and rigidity for performance.

Referring to FIG. 3(D), another embodiment of the present disclosure is illustrated. Here, a perspective view of a modular flat roller 185 is depicted. In one embodiment, modular flat roller 185 is constructed using standard length rollers, such as those that step up in length in 6-inch increments. Each of the standard-length rollers are modularly coupled, while maintains the required stiffness and rigidity for performance Modular flat roller 185 may include at least one notched end adapter.

The embodiment herein, using various diameters and lengths, may be used as an inch-size flat topside or return roller with its notched shaft ends fitting into various rise or drop brackets. This can also be used as a flat troughing idler can within a steel frame. Modular flat roller 185 may include plain shaft extensions, without the need for end adapters. In this embodiment, where modular flat roller 185 is designed using various diameters and lengths, the application may be a metric topside or return roller. Here, the shaft ends may be fastened to a machine (not shown) using various mechanical means including, for example, U-bolts, or as a metric center roller, which would fit between wing rollers. Modular flat roller 185 may also be threaded with at least one end adapters. Where roller 185 is configured from various diameters and lengths, a metric topside or return roller may be realized with its shaft ends fitting through brackets or holes and fastened with, for example, hex nuts.

In another embodiment, modular disc roller 185 may be self-cleaning with at least one notched end adapter. Where roller 185 may be configured from various diameters and lengths, an inch-size return roller may be implemented, with, for example, notched shaft ends fitting into various drop brackets. This configuration may also be used as a self-cleaning troughing idler can within, for example, a steel frame. Consequently, modular self-cleaning disc roller 185 may be implemented with plain shaft extensions and no end adapters. Modular self-cleaning disc roller 185 may be implemented in a metric return roller with its shaft ends fastened to the machine with U-bolts, for example, or as a self-cleaning metric center roller, fitting between wing rollers.

In another embodiment, modular self-cleaning disc roller 185 may include at least one threaded end adapter. Here, a modular self-cleaning disc roller 185, configured from various diameters and lengths, may be implemented as a metric return roller with its shaft ends fitting through brackets or holes, for example, and fastened by means such as with hex nuts.

In another embodiment, modular flat roller 185 may include a plain shaft extension. Here, the shaft extension may be used on one end. Where modular self-cleaning disc roller 185 of this embodiment is configured from various diameters and lengths, the resultant application may be a guide roller or a metric-style wing roller.

In another embodiment, modular flat roller 185 may include at least one flat end adapter. Here, a modular flat roller 185, configured from various diameters and lengths, may be employed as a metric center roller, fitting between at least two wing rollers.

In another embodiment, modular flat roller 185 may include at least one flat end adapter. Here, a modular self-cleaning disc roller 185, configured from various diameters and lengths, may be employed as a self-cleaning metric center roller, fitting between at least two wing rollers.

In an embodiment of the present disclosure, the pieces and configuration of exemplary roller 185 is modular. Here, the modular roller 185 may also be cut to order for each size roller. By deploying a modular design, it is contemplated by the present disclosure that roller 185 can be adapted for numerous potential applications. Modular roller 185 can also be built to replace common conveyor gravity rollers, which may use spring loaded hex ends, as shown in FIG. 1(D).

In yet another embodiment of the present disclosure, exemplary roller 185 is deployed in a conveyor return rollers. Here, parts can also be constructed for other types of conveyor flat rollers, guide rollers, and troughing roller cans, for example. It is contemplated by the present disclosure that other applications may be considered for exemplary roller 185 including use in marine environments, given the materials and construction. In that spirit, exemplary roller 185 has a wide range of applications due to the ease of maintenance and repair. Further, in another embodiment, the plastic parts used to form roller 185 may be constructed from food-grade material. Thusly, food and agricultural processing applications are also contemplated by the present disclosure. The use of food-grade material would naturally also contemplate applying exemplary roller 185, for example, in bakery machines.

In yet another embodiment of the present disclosure, exemplary roller 185 is contemplated as constructed from at least one recessed part. Here, at least one additional disc may be deployed to extend the length. Further, a threaded rod may also be used as a shaft as well as retaining hardware. Consequently, exemplary roller 185 may be implemented as a systematic integration of these types of parts, assembled in various environments.

It should be note that the present disclosure contemplates that roller 185 may have various performance enhancements. The present disclosure advances that exemplary roller 185 constructed from plastic wears better than the metal. It should be noted that the inclusion of at least one recessed end in exemplary roller 185 may be to encapsulate the retaining nuts. As roller 185 can be constructed using at least two plastic discs, the ability to perform routine maintenance repair is enhance as parts can be more easily rotated or changed out to extend the wear life, which may happen on one end.

In another embodiment, the present disclosure teaches the use of solid or molded plastic disc rollers in heavy duty conveyor applications assembled and/or rebuilt creating many benefits. These may include increased wear life as well as potential cost savings for the user assembly of discrete parts. This is realized by the transfer of assembly value-add from manufacturer to the user.

In another embodiment, the present disclosure teaches the use of recessed ends. Recessed ends may protect the retaining hardware, and therefore, extend the lifetime of exemplary roller 185. Further, recessed ends may also allow for the maximization of the length—also known as face width—of this type of part because extra room on either end of the shaft may not be required for the retaining hardware. By so doing, in one embodiment, the effective face width of the part may be the same as that of a traditional steel roller with ball bearings.

In one embodiment, exemplary 185 may include end shaft adapters. Here, the recessed ends may have greater impact because the space required for the end shaft adapter to overlap the end of the shaft may be more significant than the space required for retaining hardware. It may be impractical to adapt a shaft to any type of customized end without having the recessed end for insertion.

Figure 4A:
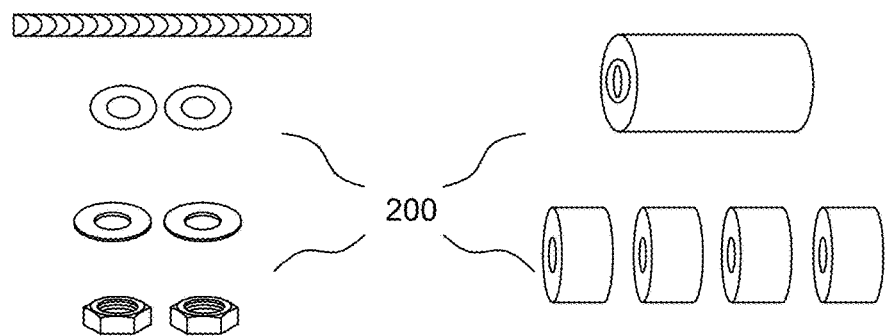
FIG. 4(A)-4(C) illustrates embodiments of the present disclosure.
Figure 4B:
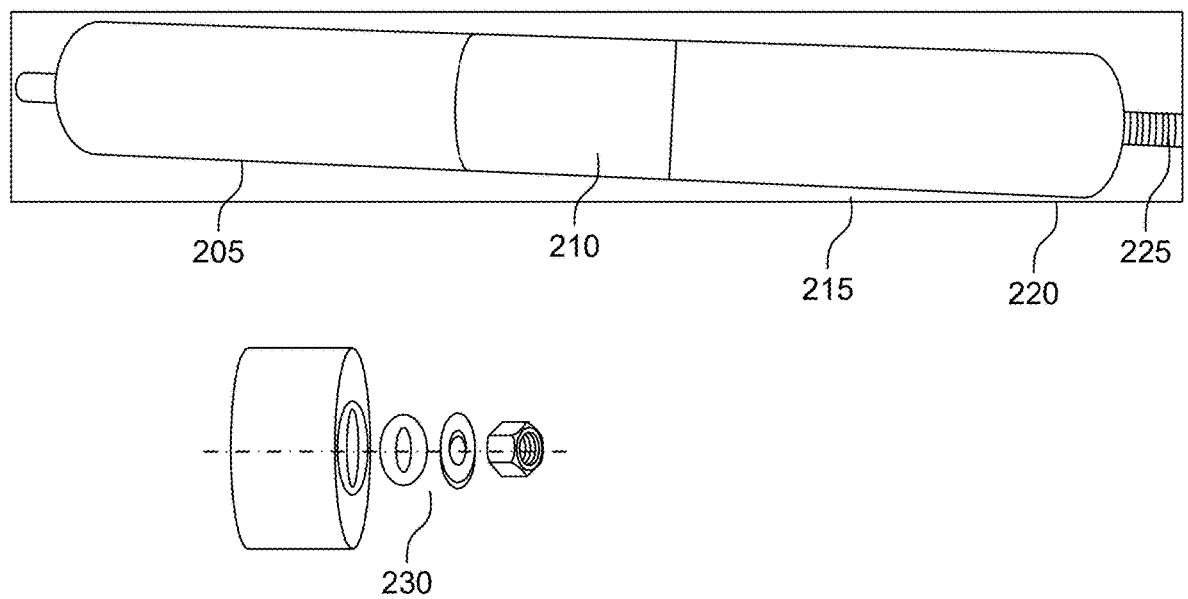
Figure 4C:
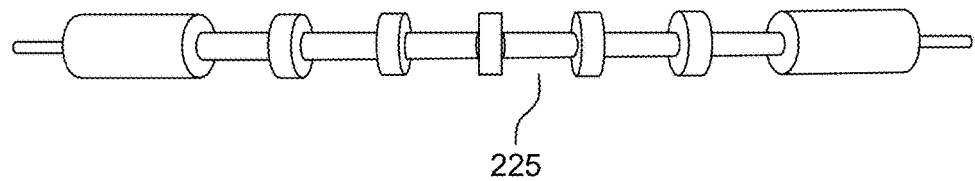

Referring to FIGS. 4(A)-(C), another embodiment of the present disclosure is illustrated. Here, the present disclosure teaches a center roller with threaded ends. The center roller may be constructed from longer black discs with recessed ends and shorter white discs in the middle.

Referring to FIG. 4(A), components 200 are shown that may be deployed in the construction of the present embodiment. More particularly, a modular roller 205 of the present disclosure is shown in FIG. 4(B). Modular roller 205, as shown, includes at least two abutting plastic discs 210. Modular roller 205 further includes at least one disc with a recessed end 210 abutting at least one side of plastic discs 210. Adjacent and in contact with recessed end 210 may include an assembly 215. Assembly 215 may include a gasket, flat washer and a nut configured in inside recessed end 210. Finally, modular roller 205 may also include a threaded rod 220. Threaded rod 220 extends past the end of modular roller 205 so it may be mounted in a system. It should be noted that in one embodiment, components 200 of FIG. 4(A) may be used to construct modular roller 205 in FIG. 4(B).

FIG. 4(B) further illustrates an exploded view of assembly 215. Here, assembly 215 depicts the retention hardware within the at least one disc with a recessed end 210. Alternate assemblies are further contemplated by the present disclosure.

Referring to FIG. 4(C), another embodiment is disclosed. Here, a self-cleaning disc roller 225 is illustrated. Self-cleaning disc roller 225 is configured with spaces in between discs. The purpose of these spaces is to enable debris to fall through. In one embodiment, self-cleaning disc roller 225 may have round shaft extensions. These extensions may necessitate a single round shaft from one end to the other. In this case, the recessed ends of the outer discs shield the assembly containing the retaining gasket, which acts as a bearing, washer, and retaining rings. It is contemplated by the present embodiment that an end shaft adapter may not be needed.

Figure 5A:
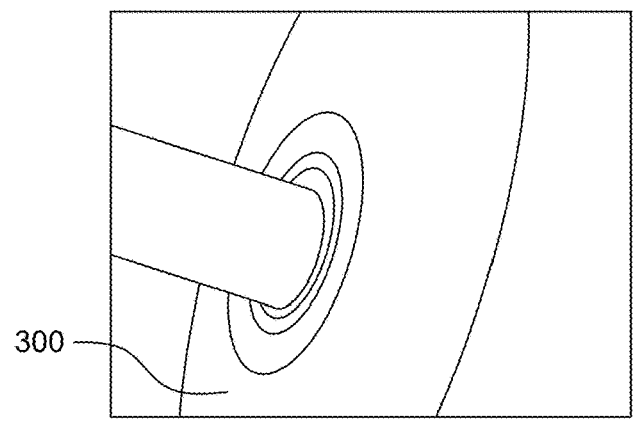
FIG. 5(A)-5(C) illustrates embodiments of the present disclosure.
Figure 5B:
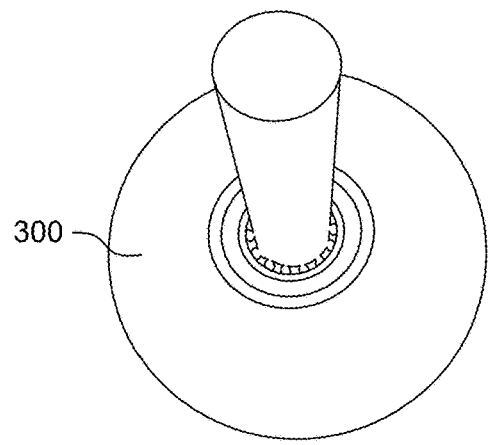

Referring to FIGS. 5(A)-(B), yet another embodiment of the present disclosure is illustrated. FIG. 5(A) shows a perspective view of roller 300. FIG. 5(B) depicts a top view of roller 300. Roller 300 includes a recessed end of plastic end disc with retaining hardware inside. Here, another perspective and aspect of the present disclosure is illustrated. This depicts a different view of recessed end.

Figure 5C:
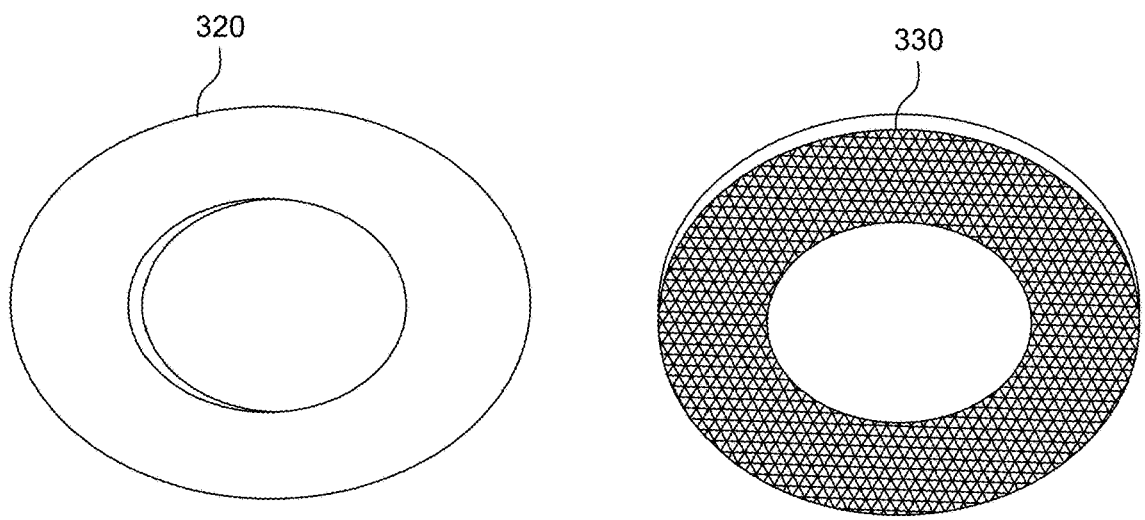

Referring to FIG. 5(C), yet another embodiment is disclosed. Here, a top and bottom of a gasket, 320 and 330, respectively, is shown. Top and bottom, 320 and 330, may be used as part of the retaining hardware. In one embodiment, this may be found inside the recessed ends, as disclosed herein. Top 320 may comprise rubber or similar material. In contrast, bottom 330 may comprise a low-friction fabric that acts like a bearing. In that regard, bottom 330 may hold the discs in place together. It is contemplated by the present disclosure that bottom 330 will enable the discs to retain the ability to rotate by sliding against the fabric.

Referring to FIG. 6, another embodiment of the present disclosure is illustrated. Here, a modular roller 335 is depicted. Modular roller 335 has many applications, one of which is to provide extra sealing when necessary. Extra sealing can be useful to keep moisture and/or fine particles from seeping between modular parts of roller 335 and into a shaft 340. To achieve this end, roller 335 includes a series of modular components 345, 355, 365 and 375, each ultimately fitted on shaft 340. Positioned in between each of modular components 345, 355, 365 and 375 are a series of sealing gaskets 350, 360 and 370. Sealing gaskets 350, 360 and 370 are constructed to keep out moisture and fine particles between modular components 345, 355, 365 and 375. It should be noted within the context of the embodiments of the present disclosure that gaskets 350, 360 and 370 can be used and are compatible with solid and/or molded modular components 345, 355, 365 and 375. Further, gaskets 350, 360 and 370 are compatible with other features of modular system, including, but not limited to different roller diameters, shaft diameters, shaft adapters and flat or disc designs.

Referring to FIGS. 7(A)-(C), yet another embodiment of the present disclosure is illustrated. Here, a molded flat modular roller 380 is depicted from various perspectives. In FIG. 7(A), flat modular roller 380 is shown constructed from molded modular roller parts with notched shaft adapters 385. Notched shaft adapters 385 of modular roller 380 is depicted from a topographical and cross-sectional view in FIG. 7(B). In another embodiment, illustrated in FIG. 7(C), notched shaft adapters 385 of modular roller 380 is illustrated as having a screw slot 390 for increasing force from adapter 385 onto modular roller 380.

Figure 8A:
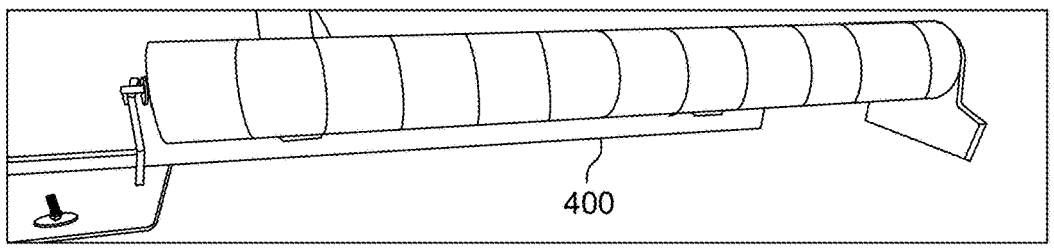
FIGS. 8(A)-(D) illustrates embodiments of the present disclosure.
Figure 8B:
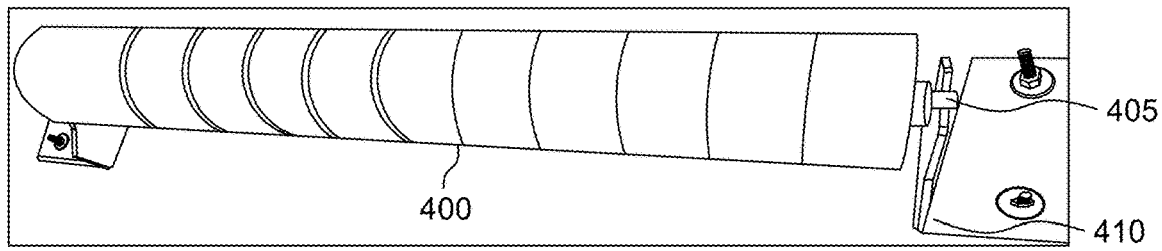
Figure 8C:
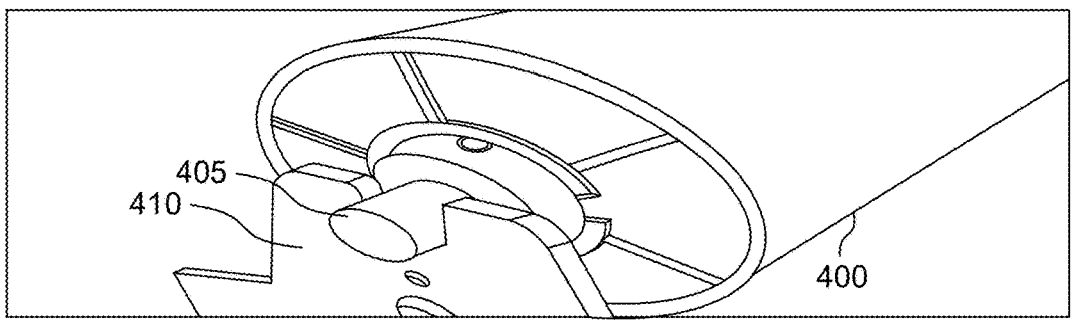
Figure 8D:
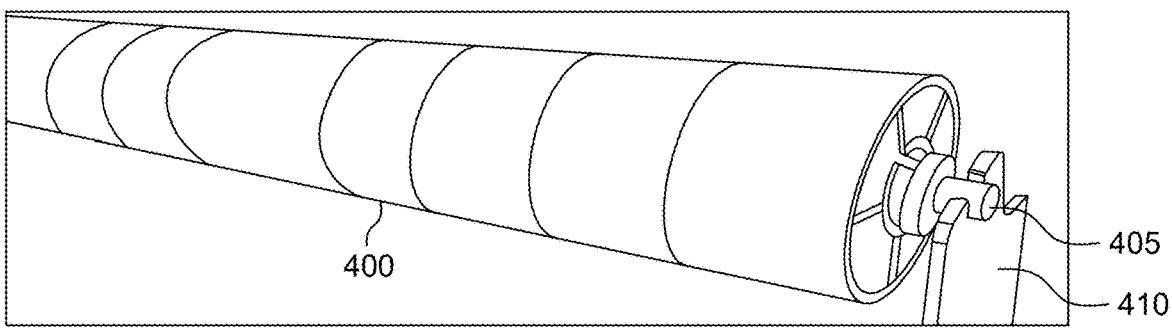

Referring to FIGS. 8(A)-(D), still another embodiment of the present disclosure is illustrated. Here, a molded flat modular roller 400 is depicted. In FIG. 8(A), modular roller 400 is shown from topographical perspective. Flat modular roller 400 is constructed with molded modular roller components as disclosed in the present teaching. In FIGS. 8(B)-(D), roller 400 is shown from various perspectives to include a notch shaft adaptor 405 for mounting on a bracket set 410.

Figure 9A:
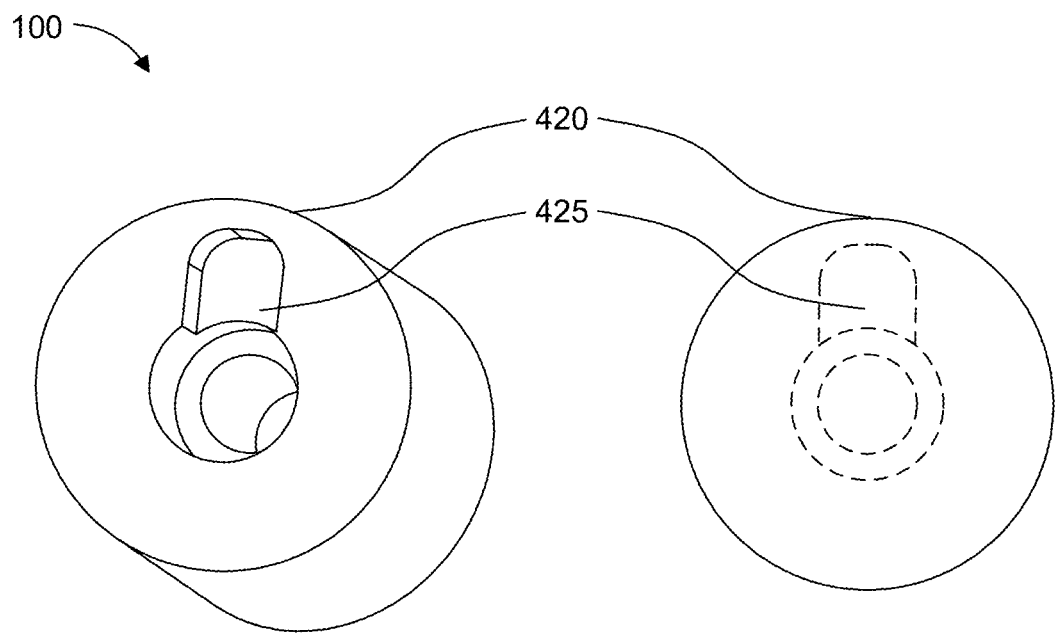
FIG. 9(A)-(B) illustrates embodiments of the present disclosure.
Figure 9B:
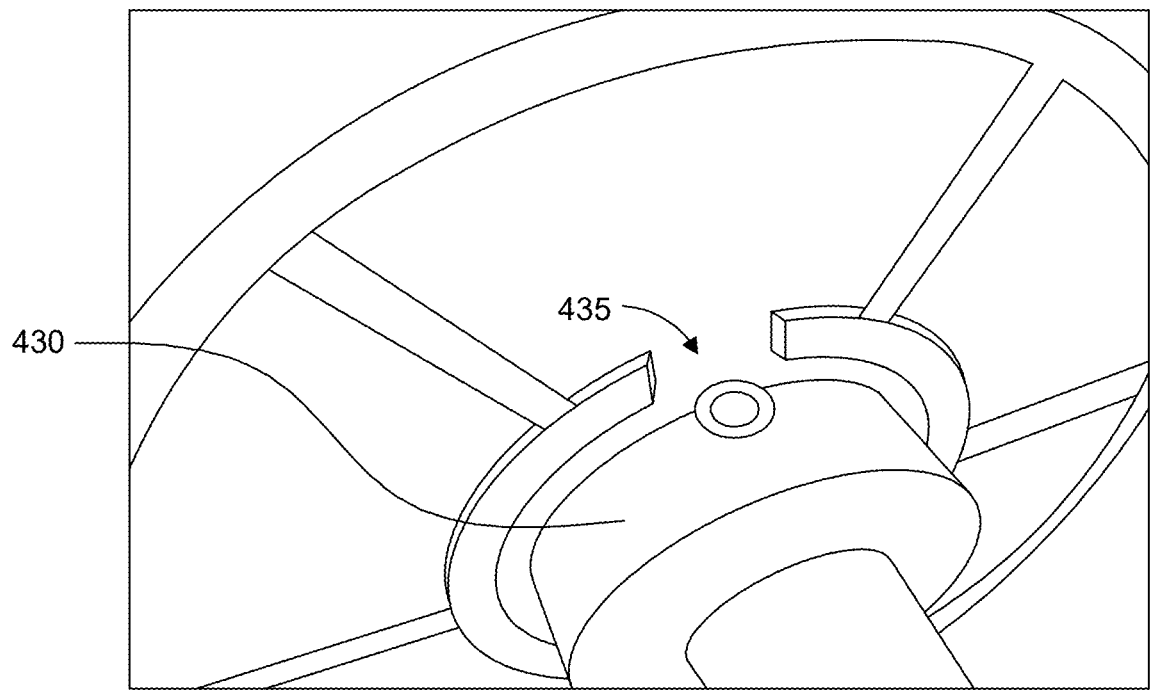

Referring to FIGS. 9(A)-(B), another embodiment of the present disclosure is illustrated. In FIG. 9(A), an end roller setscrew access mechanism 420 is depicted. End roller setscrew access mechanism 420 includes a keyhole counterbore 425. Keyhole counterbore 425 may be deployed with shaft adapters in concert with an end roller to allow access to set screws for increasing force from shaft adapter 430, as shown in FIG. 9(B), onto the modular roller (not shown). Further, shaft adapter 430, in FIG. 9(B), includes a set screw slot 435 to allow access to set screws. It should be noted that various alternatives are considered including where set screws may or may not be exposed. Should the set screws be not exposed, set screw slot 435 provides beneficial access.

Figure 10A:
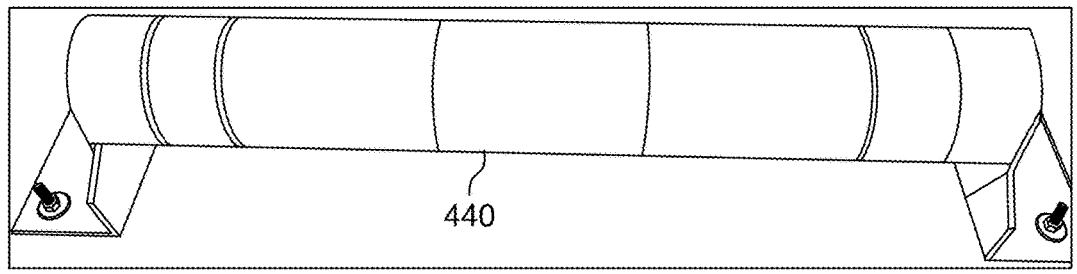
FIGS. 10(A)-(C) illustrates embodiments of the present disclosure.
Figure 10B:
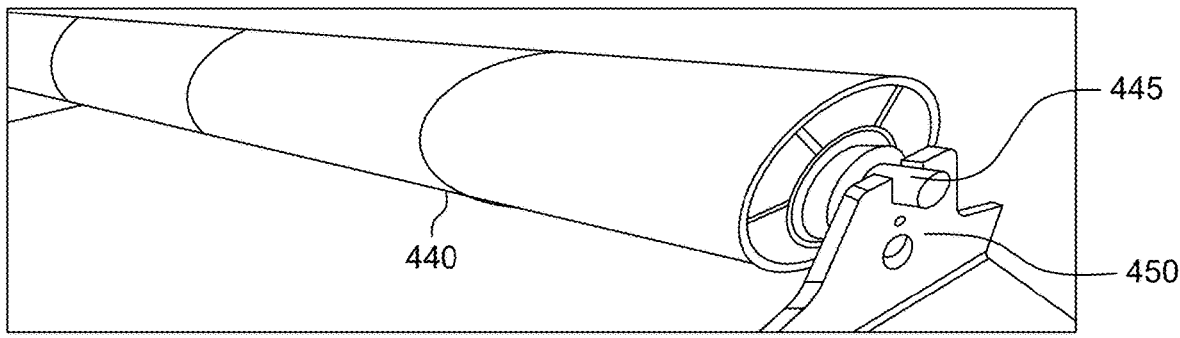
Figure 10C:
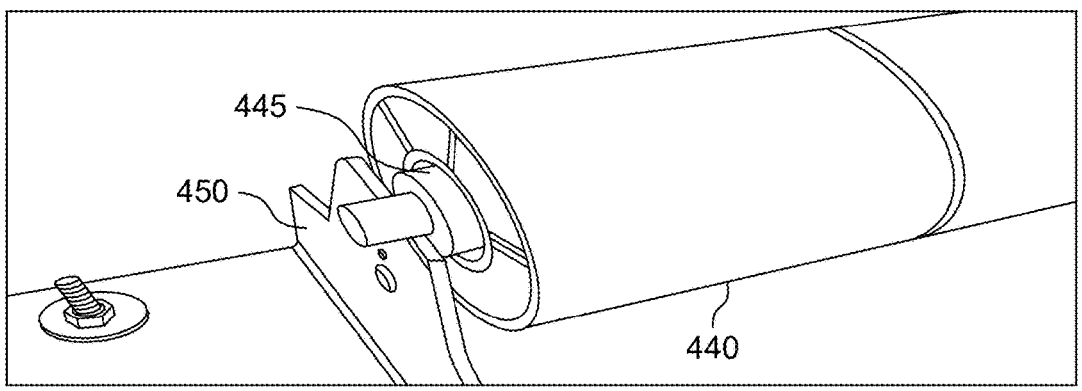

Referring to FIGS. 10(A)-(C), yet another embodiment of the present disclosure is illustrated. Here, a hybrid molded, solid flat roller 440 is shown from various perspectives. Roller 440 may be constructed with molded and/or solid modular roller components. As depicted in FIGS. 10(B)-(C), roller 440 includes a notched shaft adapter 445 mounted onto bracket 450.

Figure 11A:
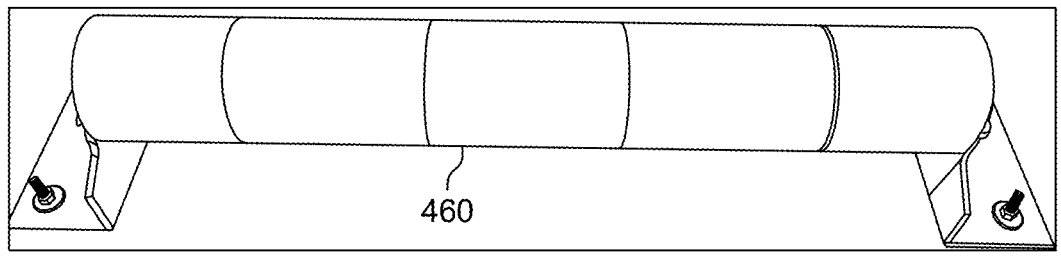
FIGS. 11(A)-(D) illustrates embodiments of the present disclosure.
Figure 11B:
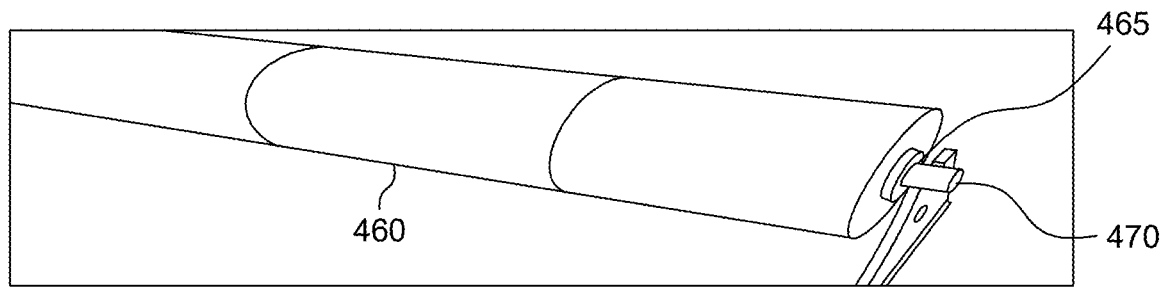
Figure 11C:
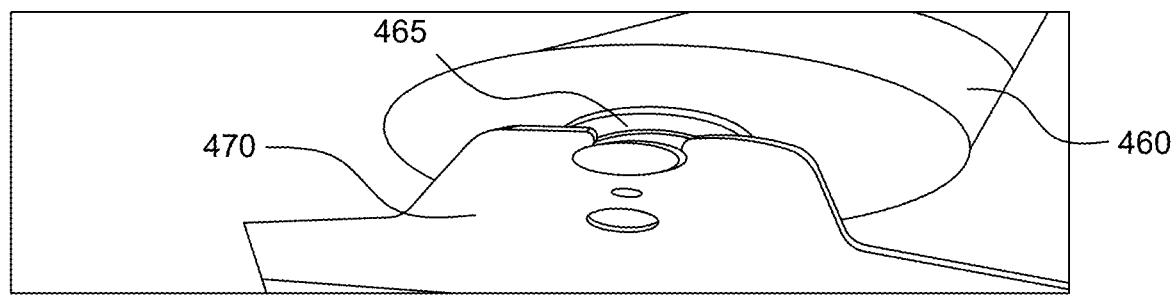
Figure 11D:
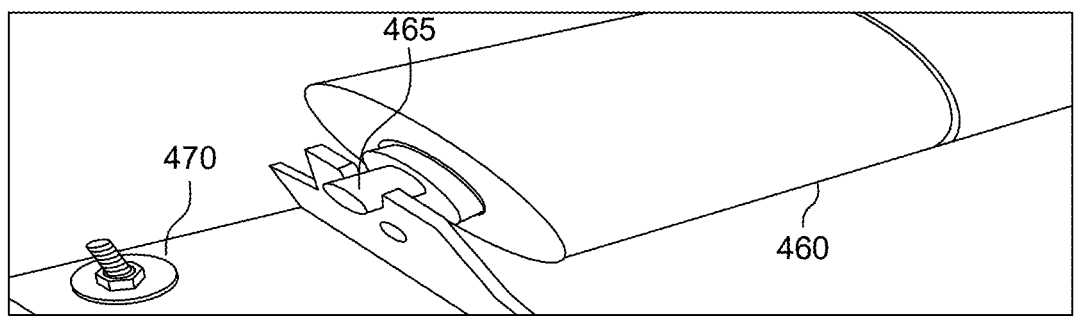

Referring to FIGS. 11(A)-(D), another embodiment of the present disclosure is illustrated. Here, a solid flat roller 460 is shown from various perspectives. Roller 460 may be constructed with solid modular roller parts. As depicted in FIGS. 11(B)-(D), roller 460 includes a notched shaft adapter 465 mounted onto bracket 470.

Figure 12A:
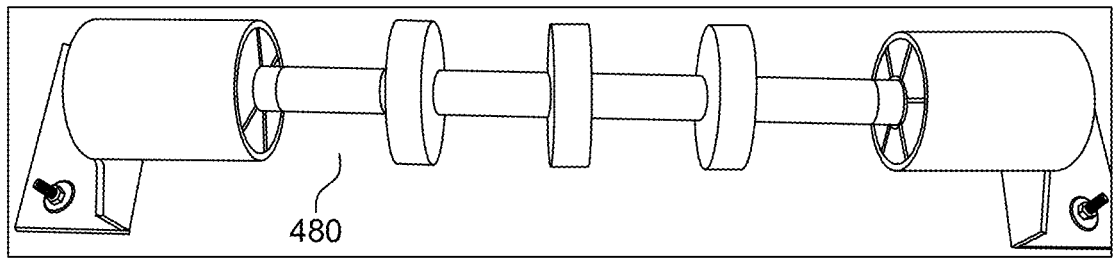
FIGS. 12(A)-(C) illustrates embodiments of the present disclosure.
Figure 12B:
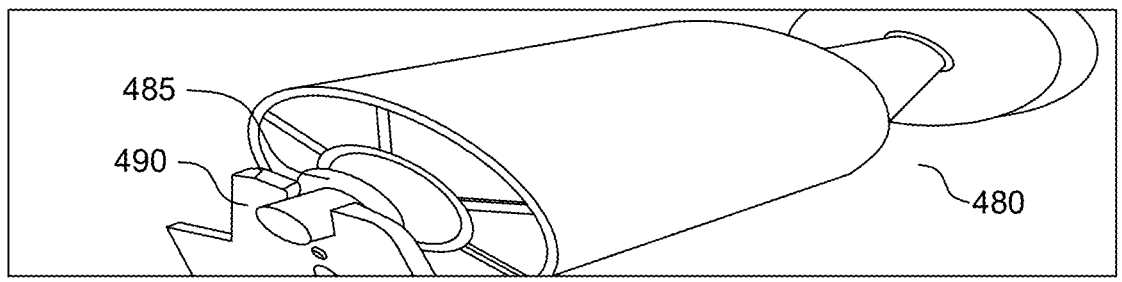
Figure 12C:
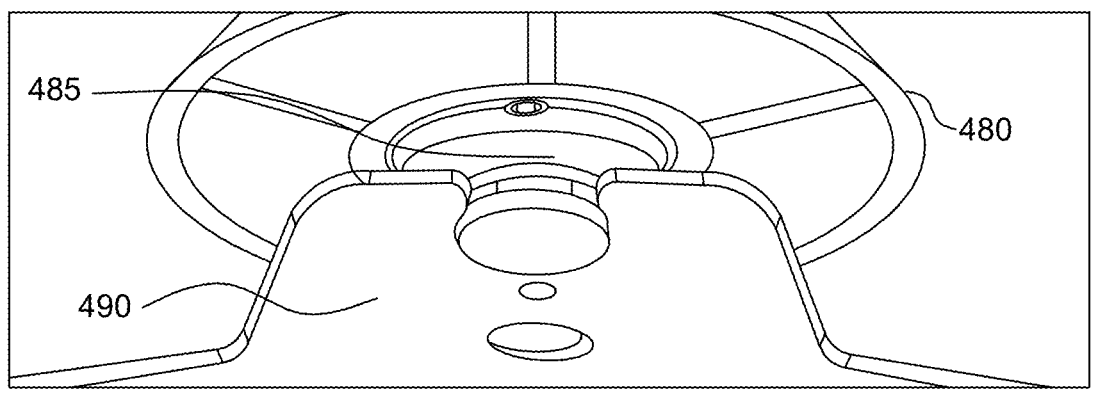

Referring to FIGS. 12(A)-(C), another embodiment of the present disclosure is illustrated. Here, a disc roller 480 is shown from various perspectives. Roller 480 may be constructed with molded and/or solid modular roller parts. As depicted in FIGS. 11(B)-(C), roller 480 includes a notched shaft adapter 485 mounted onto bracket 490.

Figure 13A:
FIGS. 13(A)-(D) illustrates embodiments of the present disclosure.
Figure 13B:
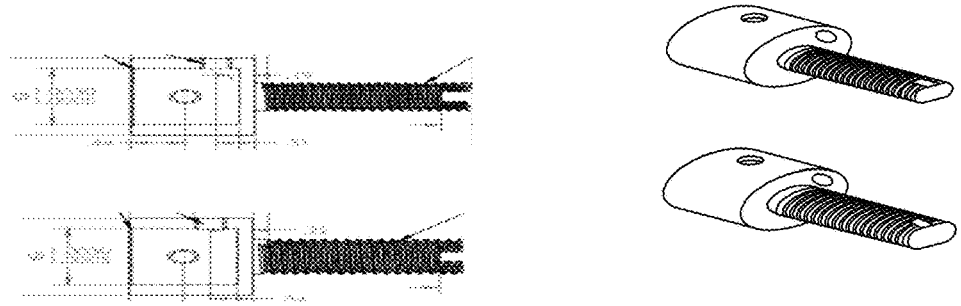
Figure 13C:
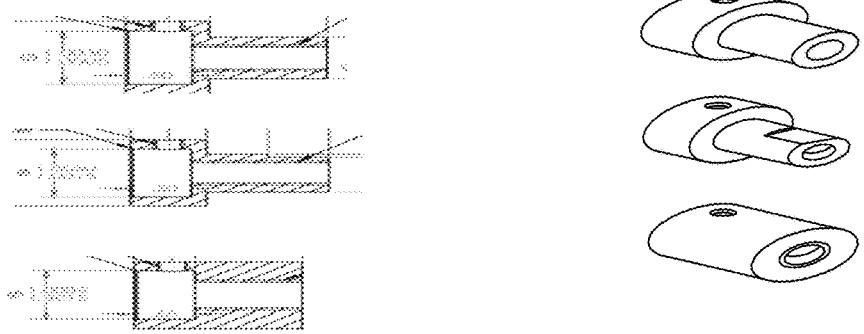
Figure 13D:
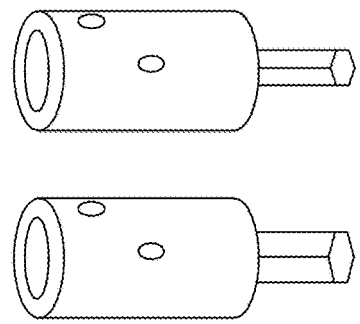

Referring to FIGS. 13(A)-(D), yet another embodiment of the present disclosure is illustrated. Here, various adapters configurations are shown. In FIG. 13(A), a notched end adaptor and a milled flat end adaptor is depicted. In FIG. 13(B), a ½ inch and a ⅝-inch male threaded end adaptor is shown. In FIG. 13(C), a female threaded end adaptor is illustrated having a round extension, a milled flat extension, and without an extension. In FIG. 13(D), a 7/16-inch and a 11/16-inch hex extended end adaptor is shown.

Figure 14A:
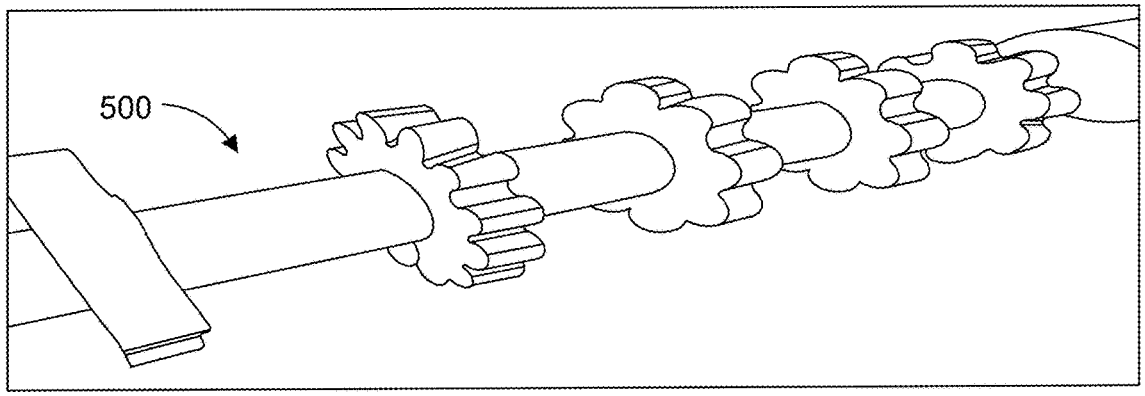
FIGS. 14(A)-(C) illustrates embodiments of the present disclosure.
Figure 14B:
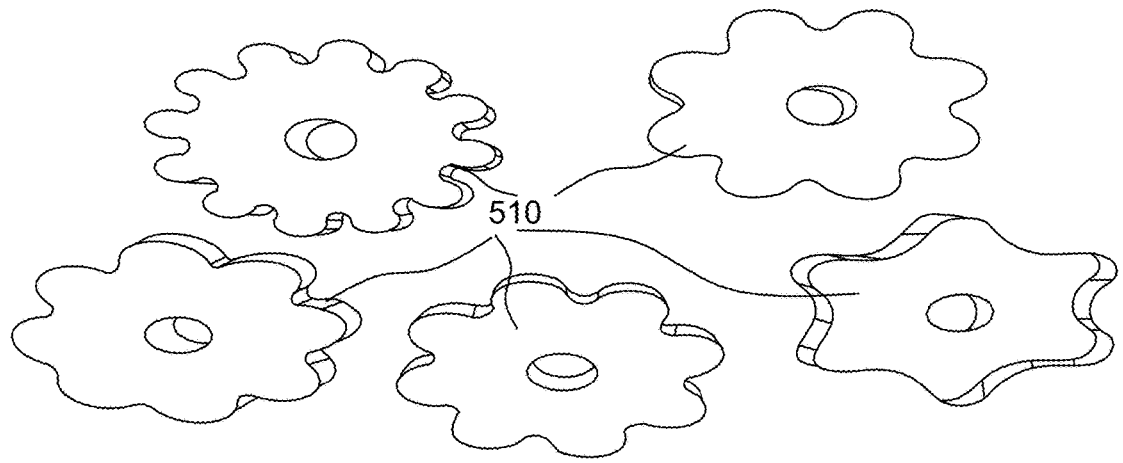

Referring to FIGS. 14(A)-(B), still another embodiment of the present disclosure is illustrated. Here, a disc roller 500 is shown. Roller 500 may be constructed with molded roller components 510. As depicted in FIG. 14(B), molded roller components 510 may have various shapes including, but not limited to, those illustrated.

Figure 14C:
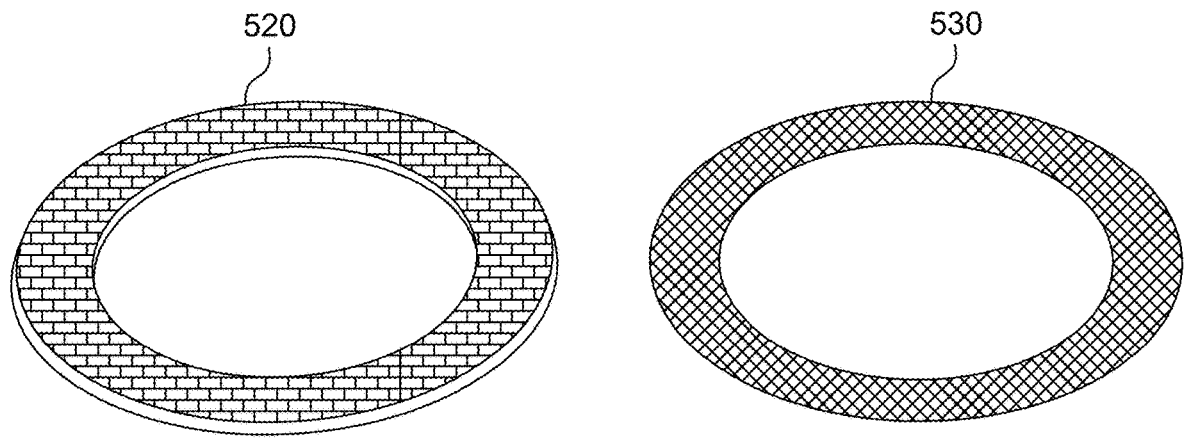

Referring to FIG. 14(C), yet another embodiment is disclosed. Here, a top and bottom, 520 and 530, of a gasket respectively, is shown. Top and bottom gasket, 520 and 530, may be used as part of retaining hardware (not shown). Top gasket 520 may comprise a low friction fabric that acts like a bearing between discs. In contrast, bottom 530 may comprise a rubber or similar material. In still another embodiment, bottom 530 comprise comprises low friction materials such as nylon and fabric. In that regard, top gasket 530 may hold the discs (not shown) in place together. It is contemplated by the present disclosure that top gasket 520 will enable the discs to retain the ability to rotate by sliding against the fabric.

Figure 15:
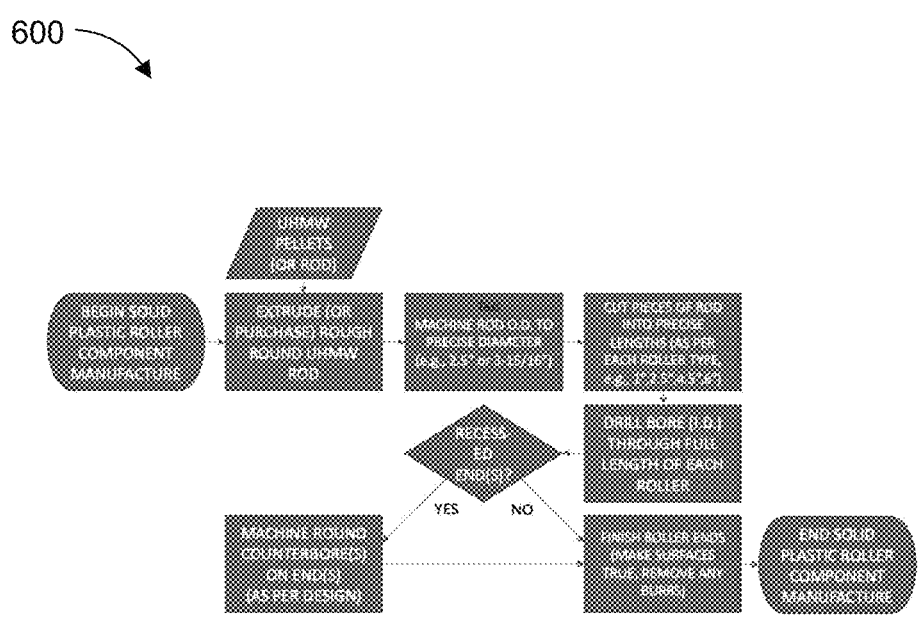
FIG. 15 illustrates an embodiment of the present disclosure.

Referring to FIG. 15, another embodiment of the present disclosure is illustrated. Here a flow chart 600 is shown of a method of manufacturing a solid plastic roller component manufacture. Initially, a rough round, ultra-high molecular weight ("UHMW") polyethylene or other plastic rod may be extruded—or purchased—from UHMW or other plastic pellets or a rod. The rough round rod is then machined to a desired, precise diameter, such as, for example, 2.5 inches or 3 inches. Thereafter, pieces of the machined rod are cut into desired, precise lengths, such as, for example, 1 inch, 2.5 inches, 4.5 inches or 6 inches. Each of the cut machined rods are then bore drilled through the full length of the roller. If recessed ends are desired, the step of machine round counterbore(s) on end(s) is performed per specification. Thereafter, the roller ends are finished by various steps including making surfaces true and removing any burrs. The method of flow chart 600 then concludes with a manufactured end solid plastic roller component.

Figure 16:
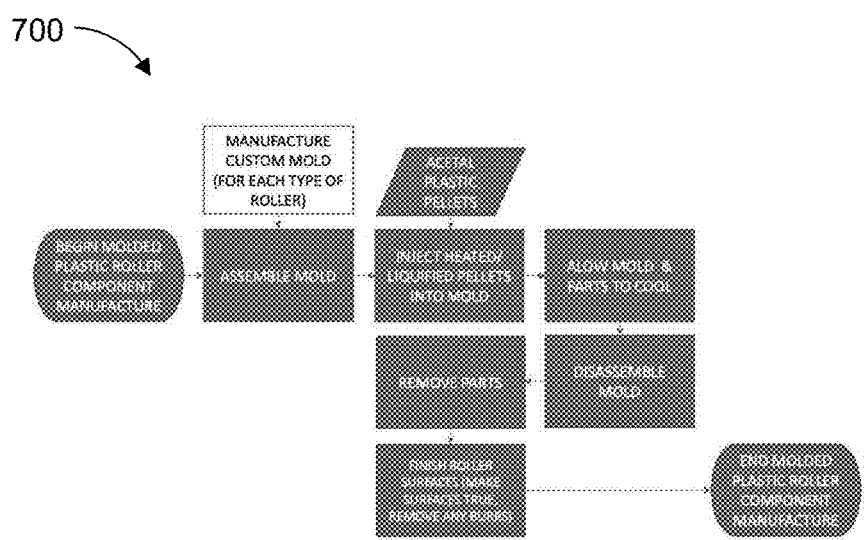
FIG. 16 illustrates an embodiment of the present disclosure.

Referring to FIG. 16, another embodiment of the present disclosure is illustrated. Here a flow chart 700 is shown of a method of manufacturing a molded plastic roller component manufacture. Initially, a mold is assembled, which may include the manufacture of a custom mold for each type of roller. Acetal or other plastic pellets are then inject heated to liquify the pellets into the aforementioned mold. The method then calls for a cooling step. The molded parts can then be removed and the mold disassembled, as desired. Thereafter, the roller surfaces are finished by various steps including making surfaces true and removing any burrs. The method of flow chart 600 then concludes with a manufactured end molded plastic roller component.

Figure 17:
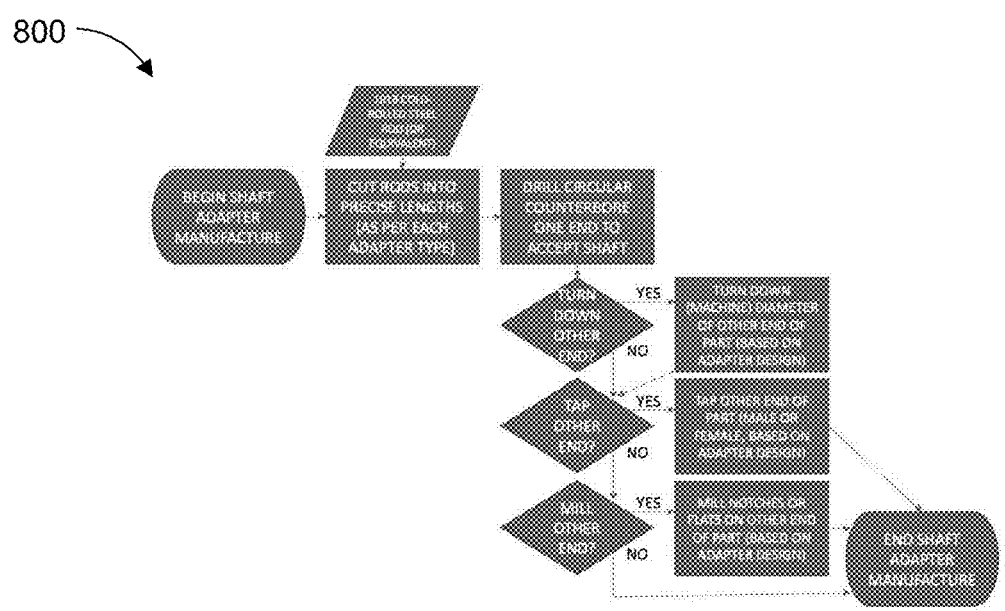
FIG. 17 illustrates an embodiment of the present disclosure.

Referring to FIG. 17, another embodiment of the present disclosure is illustrated. Here a flow chart 800 is shown of a method of manufacturing a shaft adapter manufacture. Initially, rods are cut to precise lengths as per each adapter type. In one alternative, cold-rolled steel rod, or an equivalent, may be used. Then rods are then circularly drilled to counterbore one end to accept a shaft. If the other end needs to be turned down, a turn down step is performed to machine the diameter of the other end of the part. If the other end needs to be tapped, a tap step is performed on the component, whether a male or female design, according to adapter specifications. If the other end requires milling, a milling step is performed to create notches or flats per specifications. The method of flow chart 600 then concludes with a manufactured end shaft adapter.

Figure 18:
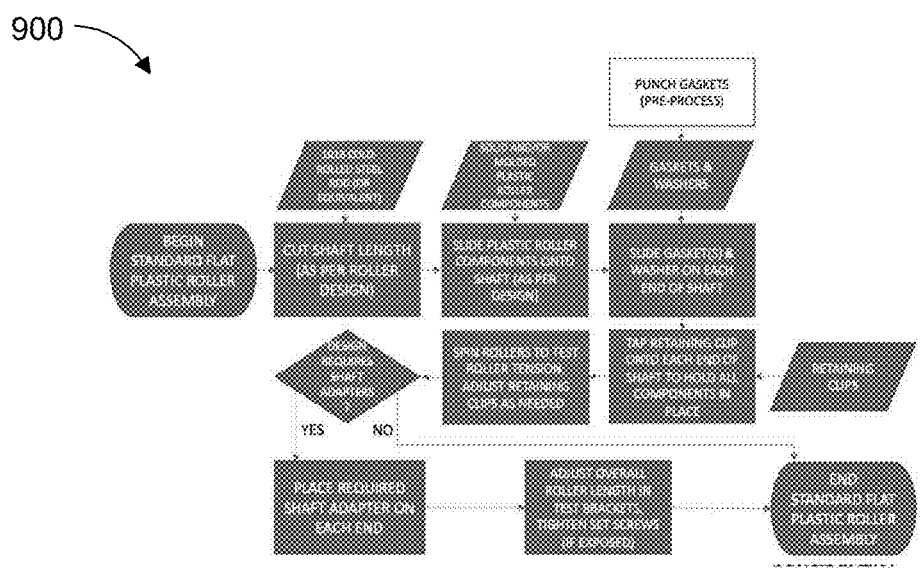
FIG. 18 illustrates an embodiment of the present disclosure.

Referring to FIG. 18, another embodiment of the present disclosure is illustrated. Here a flow chart 900 is shown of a method of manufacturing a standard flat plastic roller assembly. Initially, the shaft length is cut to the specifications of the roller design. In one alternative, cold-rolled steel rod, or an equivalent, may be used. Plastic roller components are then slid onto and along the shaft. These plastic roller components may be solid or molded plastic. Subsequently, gasket(s) and washer(s) can slide onto and along the shaft to desired positions. It should be noted that in another embodiment, the gaskets may be punched. Subsequently, a retaining clip may be tapped onto each end of shaft to hold all components in place. The method of flow chart 900 then includes for spinning the rollers to test and measure roller tension. If shaft adapters are necessary, the method comprises the step of placing the required shaft adapter on each end and then adjusting the overall roller length in test brackets, tightening the set screws if exposed. The method of flow chart 600 then concludes with a manufactured end standard flat plastic roller assembly.

Figure 19:
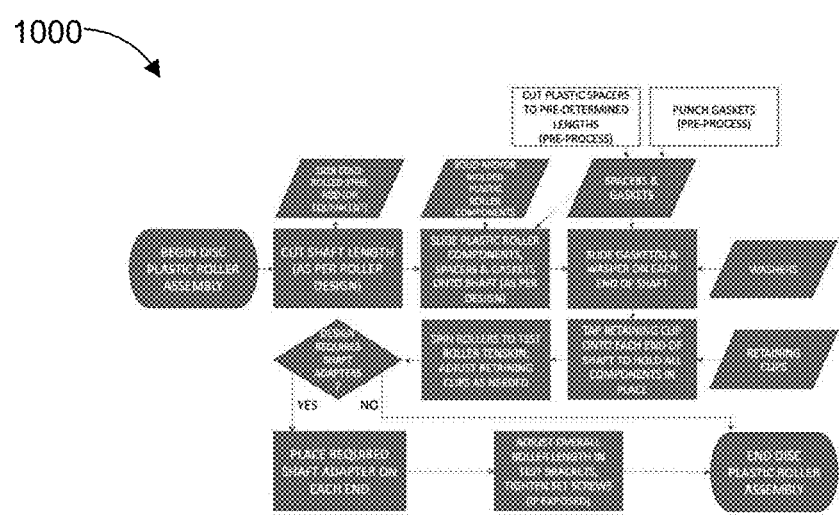
FIG. 19 illustrates an embodiment of the present disclosure.

Referring to FIG. 19, another embodiment of the present disclosure is illustrated. Here a flow chart 1000 is shown of a method of manufacturing a disk plastic roller assembly. Initially, the shaft length is cut to the specifications of the roller design. In one alternative, cold-rolled steel rod, or an equivalent, may be used. The method of flow chart 1000 then includes for sliding solid or molded plastic roller components, spacers, gaskets and washers onto and along the shaft to a desired position. If retaining clips are required, the method of flow chart 1000 includes tap each retaining clip onto the end of shaft to hold all components in place. Thereafter, the step of spinning the rollers to test and measure roller tension is performed, adjusting the retaining clips, if used, as necessary. In another embodiment, shaft adapters may be added on each end as required. The overall roller length can then be adjusted in test brackets, and exposed set screws may be tightened as necessary. The method of flow chart 1000 then concludes with a manufactured end disc plastic roller assembly.

It should be understood that the figures in the attachments, which highlight the structure, methodology, functionality and advantages of this disclosure, are presented for example purposes only. This disclosure is sufficiently flexible and configurable, such that it may be implemented in ways other than that shown in the accompanying figures.

The invention claimed is:

1. A modular roller system comprising:
 a mechanical shaft;
 one or more plastic discs, wherein the one or more plastic discs comprise a recessed end;
 an assembly in physical contact with the recessed end and positioned inside of the recessed end, the assembly comprising a retaining fastener configured to seal out dirt and provide shielding from external materials; and
 at least one end adapter removably attachable to the mechanical shaft and configured to adapt to different shaft end configurations,
 wherein each of the one or more plastic discs slides onto and around the mechanical shaft using a frictionless bearing system.

2. The modular roller system of claim 1, wherein at least one of the plastic discs comprises at least one of ultra-high molecular weight polyethylene plastic, and acetal plastic.

3. The modular roller system of claim 2, wherein the mechanical shaft comprises at least one of solid steel, stainless steel, and carbon.

4. The modular roller system of claim 3, wherein each of the one or more plastic discs comprises a hole bored in the center to accommodate the mechanical shaft.

5. The modular roller system of claim 4, wherein each of the one or more plastic discs further comprises end pieces, each of the end pieces comprising a recess.

6. The modular roller system of claim 5, further comprising multi-piece rollers, wherein each of the rollers comprise at least one end recessed and capped on one end with the mechanical shaft extending out a second other end.

7. The modular roller system of claim 1, further comprising one or more gaskets positioned between the one or more plastic discs and the retaining fastener.

* * * * *